United States Patent
Yin

(10) Patent No.: US 9,608,961 B2
(45) Date of Patent: *Mar. 28, 2017

(54) FIREWALL POLICY MANAGEMENT

(71) Applicant: Fortinet, Inc., Sunnyvale, CA (US)

(72) Inventor: Jun Yin, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,868

(22) Filed: Aug. 1, 2016

(65) Prior Publication Data

US 2016/0344696 A1    Nov. 24, 2016

Related U.S. Application Data

(63) Continuation of application No. 15/073,312, filed on Mar. 17, 2016, now Pat. No. 9,438,563, which is a continuation of application No. 13/851,456, filed on Mar. 27, 2013, now Pat. No. 9,338,134.

(51) Int. Cl.
*G06F 17/00* (2006.01)
*H04L 29/06* (2006.01)

(52) U.S. Cl.
CPC ...... *H04L 63/0263* (2013.01); *H04L 63/0236* (2013.01); *H04L 63/1425* (2013.01); *H04L 63/164* (2013.01); *H04L 63/20* (2013.01)

(58) Field of Classification Search
CPC ............. H04L 63/0263; H04L 63/0236; H04L 63/1425; H04L 63/164; H04L 63/20
USPC ........................................................... 726/1
See application file for complete search history.

(56) References Cited

U.S. PATENT DOCUMENTS

| | | | |
|---|---|---|---|
| 7,684,320 B1 | 3/2010 | Nucci | |
| 7,685,627 B2 * | 3/2010 | Joubert | H04L 63/0263 726/1 |
| 7,849,502 B1 * | 12/2010 | Bloch | H04L 12/2602 726/11 |
| 8,973,088 B1 * | 3/2015 | Leung | H04L 63/00 726/1 |
| 9,032,070 B1 | 5/2015 | Stickle et al. | |
| 9,166,992 B1 | 10/2015 | Stickle et al. | |
| 9,338,134 B2 | 5/2016 | Yin | |

(Continued)

OTHER PUBLICATIONS

Ehab S. Al-Shaer; Firewall Policy Advisor for Anomaly Discovery and Rule Editing; IEEE-2003; p. 17-30.*

(Continued)

*Primary Examiner* — Monjour Rahim
(74) *Attorney, Agent, or Firm* — Hamilton, DeSanctis & Cha LLP

(57) ABSTRACT

Methods and systems are provided for creation and implementation of firewall policies. According to one embodiment, a firewall maintains a log of observed network traffic flows. An administrator may request the firewall to generate a customized report based on the logged network traffic by extracting information from the log based on specified report parameters. The report includes aggregated network traffic items and one or more corresponding action objects. Responsive to receipt of a directive to implement an appropriate firewall policy for one or more network traffic items based on interaction with one or more action objects by the administrator, the firewall then automatically defines and establishes an appropriate firewall policy.

22 Claims, 12 Drawing Sheets

(56) References Cited

U.S. PATENT DOCUMENTS

| | | | |
|---|---|---|---|
| 9,438,563 B2* | 9/2016 | Yin | H04L 63/0236 |
| 2002/0046170 A1 | 4/2002 | Gvily | |
| 2005/0076238 A1* | 4/2005 | Ormazabal | H04L 43/0894 |
| | | | 726/4 |
| 2005/0114707 A1* | 5/2005 | DeStefano | H04L 63/1416 |
| | | | 726/4 |
| 2006/0174337 A1* | 8/2006 | Bernoth | H04L 63/0263 |
| | | | 726/11 |
| 2009/0198707 A1* | 8/2009 | Rohner | H04L 63/1408 |
| 2010/0162350 A1* | 6/2010 | Jeong | H04L 63/1416 |
| | | | 726/1 |
| 2010/0306847 A1* | 12/2010 | Lambert | G06F 21/552 |
| | | | 726/24 |
| 2013/0019314 A1* | 1/2013 | Ji | H04L 67/02 |
| | | | 726/25 |
| 2013/0031600 A1* | 1/2013 | Luna | G06F 21/554 |
| | | | 726/1 |
| 2015/0350938 A1 | 12/2015 | Heikkila et al. | |
| 2015/0372977 A1 | 12/2015 | Yin | |
| 2016/0197883 A1 | 7/2016 | Yin | |

OTHER PUBLICATIONS

Non Final Rejection for U.S. Appl. No. 13/851,456 mailed Oct. 20, 2015.

Ritu Chandha., "Policiy-Based Mobile Ad Hoc Network Management." 2006. Citeseer; pp. 1-10.

Notice of Allowance for U.S. Appl. No. 13/851,456 mailed Mar. 28, 2016.

Notice of Allowance for U.S. Appl. No. 15/073,312 mailed Jul. 28, 2016.

* cited by examiner

400

| User | Source IP | Destination IP | Application | Importance | Port | Duration | Usage (MB) |
|---|---|---|---|---|---|---|---|
| Kooby Yin | S1 | D1 | Minecraft | High | 82 | 11/8,11:30-12:50 | 23 |
| Hans Yin | S2 | D1 | Minecraft | High | 80 | 11/8,12:08-16:13 | 9 |
| Kooby Yin | S1 | D3 | Aim | Moderate | 112 | 11/8,14:30-16:40 | 14 |
| Kooby Yin | S1 | D1 | Minecraft | Low | 82 | 11/8,15:15-17:45 | 31 |
| Alice Liu | S4 | D2 | Facebook | Moderate | 80 | 11/9,10:10-11:25 | 15 |
| Cathy Zhang | S5 | D4 | Skype | High | 94 | 11/9,11:56-12:15 | 10 |
| Hans Yin | S2 | D1 | Minecraft | Low | 87 | 11/9,12:00-14:30 | 35 |
| Echo Zhu | S3 | D2 | Facebook | High | 82 | 11/9,12:30-13:30 | 20 |
| Kooby Yin | S1 | D1 | Minecraft | Low | 82 | 11/9,13:05-15:16 | 34 |
| Hans Yin | S2 | D2 | Facebook | High | 80 | 11/9,16:10-16:20 | 12 |

| User | Application | Duration | Usage (MB) |
|---|---|---|---|
| Kooby Yin | Minecraft | 11/8,11:30-12:50 | 23 |
| Kooby Yin | Aim | 11/8,14:30-16:40 | 14 |
| Kooby Yin | Minecraft | 11/8,15:15-17:45 | 31 |
| Kooby Yin | Minecraft | 11/9,13:05-15:16 | 34 |

ACTION BY IDENTITY

OK! YOU SELECT TO DO SOME ACTION AGAINST BELOW TRAFFIC:

IDENTITY: KOOBY YIN
APPLICATION : MINECRAFT

THE ACTIONS YOU COULD DO INCLUDE:

☑ BLOCK IT TOTALLY
☐ ASSIGN A SCHEDULE ▽
    ☐ 7:30PM-----8:30PM IN WEEKDAY
    ☐ 10:30AM-----15:20PM IN WEEKEND
    ☐ AT MOST ONE HOUR IN ANY WEEKDAY
    ☐ AT MOST THREE HOURS IN ANY WEEKEND
    ☐ MORE CUSTOMIZE OPTION
☐ SETUP BANDWIDTH LIMITATION ▽
    ☐ LIMIT BANDWIDTH TO [2 Bbps] ▽
        ☐ 8:00AM-----6:00PM
    ☐ LIMIT TRAFFIC VOLUME TO [50M BYTE] ▷
☐ FLOW DIRECTION
    ☑ ANY TO ANY
    ☐ INTERNAL TO EXTERNAL
    ☐ CUSTOMIZE ▷

[ SUBMIT ] [ CANCEL ]

ACTION BY APPLICATION

OK! YOU SELECT TO DO SOME ACTION AGAINST BELOW TRAFFIC:

APPLICATION: MINECRAFT ▷
IDENTITY : ANYONE ▷

*BY CLICKING HERE, YOU SHOULD BE ABLE TO SPECIFY IDENTITY BY USERNAME OR GROUP NAME*

THE ACTIONS YOU COULD DO INCLUDE:

☐ BLOCK IT TOTALLY ▷
☐ ASSIGN A SCHEDULE ▽
    ☐ 7:30PM------8:30PM IN WEEKDAY
    ☐ 10:30AM------15:20PM IN WEEKEND
    ☐ AT MOST ONE HOUR IN ANY WEEKDAY
    ☐ AT MOST THREE HOURS IN ANY WEEKEND
    ☐ MORE CUSTOMIZE OPTION
☑ SETUP BANDWIDTH LIMITATION ▽
    ☐ LIMIT BANDWIDTH TO [2 Bbps] ▽
        ☐ 8:00AM------6:00PM
    ☑ LIMIT TRAFFIC VOLUME TO [50M BYTE] ▷
FLOW DIRECTION
    ☐ ANY TO ANY
    ☑ INTERNAL TO EXTERNAL
    ☐ CUSTOMIZE ▷

| SUBMIT | CANCEL |

FIG.8

FIREWALL POLICY MANAGEMENT

CROSS-REFERENCE TO RELATED APPLICATIONS

This application is a continuation of U.S. patent application Ser. No. 15/073,312, filed Mar. 17, 2016, which is a continuation of U.S. patent application Ser. No. 13/851,456, filed Mar. 27, 2013, now U.S. Pat. No. 9,338,134, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2016, Fortinet, Inc.

BACKGROUND

Field

Embodiments of the present invention generally relate to the field of computer networks. In particular, various embodiments relate to systems and methods for improved and efficient firewall policy creation and management.

Description of the Related Art

The Internet is a network of networks and relates to a global collection of interconnected local, mid-level, wide area networks that use Internet Protocols as the network layer protocol. As the Internet and its underlying technologies are becoming increasingly popular, focus on Internet security and computer network security, in general, is also becoming a topic of growing concern. For instance, growing access to unlimited information available on the Internet gives rise to an opportunity to gain unauthorized access to data, which can relate to threats, such as modification of data, deletion of data, unauthorized use of computer resources, undesired interference with intended use of computer resources, among other such threats. Such threats give rise to development of techniques responsible for handling security of networks and computers served by those networks.

A firewall, as one of the commonly used network security or access control mechanisms, is typically configured to shield data and resources from computer network intruders and create an electronic boundary that prevents unauthorized users from accessing files or other content on a network or a computer. A firewall may be provided at an edge of a network ("edge firewall") that interfaces with computers or resources outside the network and functions as a mechanism for monitoring and controlling flow of data between resources within the network and those outside such that all communication, such as data packets, requests for web pages, request for specific information, which flows between the networks in either direction passes through firewall. A firewall can be configured to selectively permit communication from one network to another network or device so as to provide bi-directional security.

A firewall is typically installed on or otherwise implemented by a computer or any other computing device for protecting against unsecured networks coupled thereto and is configured to monitor network traffic and filter content requests based on a predetermined set of policies. Such firewall policies may define one or more filtering criteria based on how an organization's firewalls should handle inbound and outbound network traffic for specific IP addresses and address ranges, protocols, applications, and content types, through one or more rules, which protect the device or the network. For instance, such criteria may result in the prevention of computers having certain IP addresses from accessing defined social networking websites or secured databases.

Each firewall policy is a list of ordered rules that define action to be taken on matching packets and help control access to and from the firewall and machines behind it. For instance, meeting of a rule defined by a firewall can allow passing of a packet at issue into or from the secure network, while non-compliance with the rule can cause the packet to be discarded. Firewall policies are typically managed by a network administrator using a firewall management interface or any other appropriate software that presents attributes or parameters of network resources and allows the administrator to put or remove restrictions on the usage of the resources for efficient flow of traffic and compliance with information security policies of the organization.

Existing firewall policy management systems require network administrators to have ability to comprehend various attributes of the network traffic including source interface, destination interface, source IP, destination IP, event ID, importance, application details, port details, traffic details, timestamps, user details, source device details, destination device details, level of trust, source operating system details, virus scan level, and schedule, for them to be able to define appropriate policies. This, in turn, requires the network administrator to understand issues relating to network protocols, kinds of traffic, types of application, numbers of ports and use thereof, access controls and security configurations, among others, which presume in-depth technical understanding of computer networks and also of information security needs of the company, as a result of which only a limited set of skilled people possessing the appropriate technical know-how are able to effectively define and manage firewall policies.

Furthermore, existing firewall policy management systems, by virtue of incorporating multiple interconnected network parameters and resource information, introduce significant complexity in the manner in which they are used and/or monitored. Such complexity makes it difficult to introduce changes in the policies as it may adversely impact other components of the system. Existing systems also do not allow effective monitoring of specific resources and generation of accurate reports that are easy to interpret.

In view of the foregoing, there exists a need for systems and methods that can facilitate creation and management of firewall policies.

SUMMARY

Methods and systems are described for creation and management of firewall policies in computer networks. Each firewall policy includes a list of ordered rules, which define desired actions to be taken by a firewall on selected applications, types of applications, users, or groups of users based on security policies of the organization and/or based on the traffic patterns of network interactions.

According to one embodiment, a method includes enabling a firewall to maintain a log of network traffic observed by the firewall by storing, for each network traffic flow, information such as bandwidth usage, source interface, destination interface, source Internet Protocol (IP) address, destination IP address, event ID, importance, application details, port information, traffic details, timestamps, user details, source device details, destination device details, level of trust, source operating system details, virus scan level, schedule, among other such information.

The method further includes enabling firewall device to receive an administrator request for a customized and interactive report to be generated based on the log. The administrator request can include report parameters, such as a specified time frame, a specified user, a specified user group, a specified application, a specified bandwidth, a specified type of application, among other such parameters. Based on the request, the firewall generates a customized and interactive report by extracting information from the log based on the report parameters. The report may present resulting network traffic items in an aggregate form corresponding to one or more traffic aggregation parameters (e.g., by user or user group, by time frame, by application, by type of application or the like). The report may further include information such as total running time, total bandwidth usage, among other such information for each of network traffic item and also include an action object corresponding to each network traffic item.

The method may further provide for the firewall to receive a directive to implement an appropriate firewall policy on one or more network traffic items responsive to interaction by the administrator with an action object corresponding to one of the aggregated network traffic items. Based on the directive and information extracted from the log, the firewall can automatically define and establish the appropriate firewall policy.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4A illustrates an event log in accordance with an embodiment of the present invention.

FIG. 4B illustrates a report generated by the proposed firewall policy management system in accordance with an embodiment of the present invention.

FIG. 5 illustrates a screenshot of the proposed firewall policy management system in accordance with an embodiment of the present invention.

FIG. 7 illustrates a screenshot of the proposed firewall policy management system in accordance with an embodiment of the present invention.

FIG. 8 illustrates a screenshot of the proposed firewall policy management system in accordance with an embodiment of the present invention.

DETAILED DESCRIPTION

Figure 1:
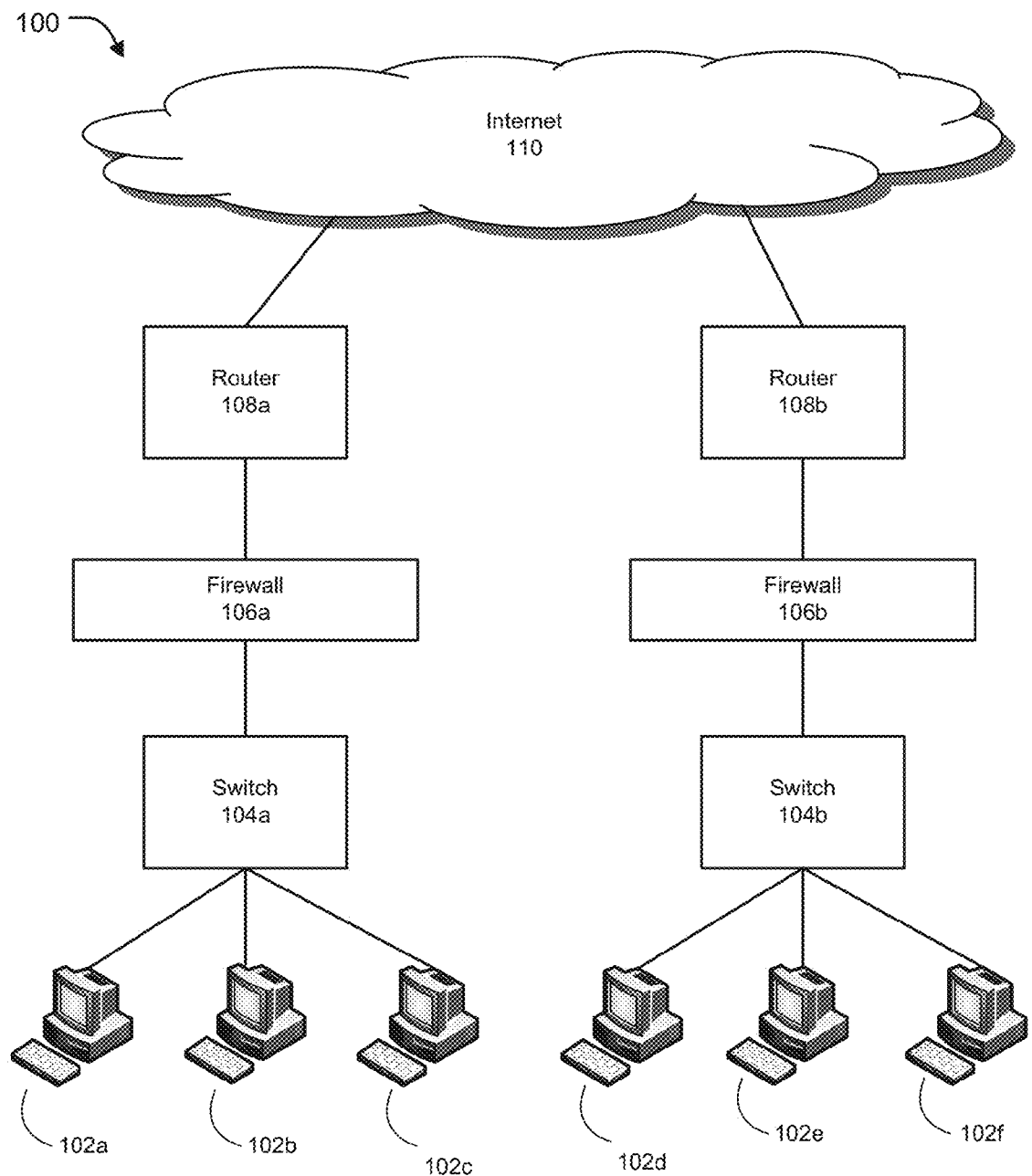
FIG. 1 illustrates exemplary network architecture in accordance with an embodiment of the present invention.

Methods and systems are described for creation and management of firewall policies in computer networks. Embodiments of the present invention generally relate to methods and systems for improved and efficient firewall policy creation and management. Embodiments of the present invention allow efficient and user-friendly mechanisms and techniques for firewall policy creation, implementation, and management through a list of ordered rules, which define desired actions to be taken by a firewall on selected applications or users based on organizational requirements, industry standards, network traffic pattern of network interactions, characteristics of packets flowing there through, among other attributes. There is also a need for methods and systems that do not require network administrator to understand technicalities of underlying networking hardware involved in network configurations, and instead allow users to use one or more action objects to control settings of network traffic items and easier definition, creation, and deployment of policies.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of creating and implementing firewall policies, it should be appreciated that the same has been done merely to illustrate the invention in an exemplary manner and any other purpose or function for which the explained structure or configuration can be used, is covered within the scope of the present disclosure.

FIG. 1 is an exemplary network architecture conceptually illustrating a system 100 having computing devices 102, alternatively also referred to as network appliances 102 hereinafter, for sending and receiving packets of network information from external networks 110 in accordance with an embodiment of the present invention.

According to an embodiment of the present invention, FIG. 1 illustrates an exemplary network architecture 100 having computing devices 102a, 102b, . . . , 102n, collectively referred to as computing devices 102 hereinafter operatively coupled to Internet 110 through one or more networking devices such as switches 104a and 104b, collectively referred to as switches 104 hereinafter, firewalls 106a and 106b, collectively referred to as firewalls 106 hereinafter, and routers 108a and 108b, collectively referred to as routers 108 hereinafter. Computing devices 102 can include personal computers, smart devices, web-enabled devices, tablet PC's, printers, hand-held devices, laptops, among other such devices that can request or receive data packets of information from Internet 110 through use of multiple network devices.

Although the present disclosure has been explained with reference to Internet 110, it should be appreciated that any appropriate network such as Intranet and Extranet can also be used for implementation of the present invention. Furthermore, the network configuration as illustrated in FIG. 1 is merely for illustration purposes and any other network device such as hub, gateway, and access points can also be suitably incorporated in the present invention. It should further be appreciated that multiple communication interfaces or ports can be made available for any of the network devices or computing devices.

As illustrated in FIG. 1, computing devices 102a, 102b, and 102c are operatively coupled with switch 104a, which enables desired and efficient routing and management of incoming and outgoing traffic or data packets. Switch 104a is connected with firewall 106a, which functions as a mechanism for monitoring and controlling flow of data packets in the form of requests for web pages, request for specific information from/to computing devices 102a-c. Firewall 106a therefore controls the flow of data packets that are passed from the computing devices 102a-c to Internet 110 and from Internet 110 to computing devices 102a-c based on type, kind, or other attributes of data packets. Firewall 106a can in turn be coupled with router 108a that enables routing of traffic from/to Internet 110.

Similarly, as illustrated in FIG. 1, computing devices 102d, 102e, and 102f are operatively coupled with switch 104b, which enables desired and efficient routing and management of incoming and outgoing traffic or data packets. Switch 104b is connected with firewall 106b that controls flow of data packets that are passed from computing devices 102d-f to Internet 110 and from Internet 110 to computing devices 102d-f based on their type, kind, or other attributes. Firewall 106b can in turn be coupled with router 108b to enable routing of traffic from/to Internet 110.

As mentioned above, network architecture as illustrated in FIG. 1 is merely an exemplary embodiment and multiple other configurations and/or networking devices can be incorporated in the architecture to serve the intended need of network and traffic flow. For instance, in an embodiment, all computing devices can be covered under a local area network (LAN), which is connected directly to a router and then to a firewall for access to Internet. Furthermore, according to an embodiment, firewall 106 can be installed on a computing device or within a network device, which may be equipped with an ability to trace traffic flow and network interactions.

Figure 2:
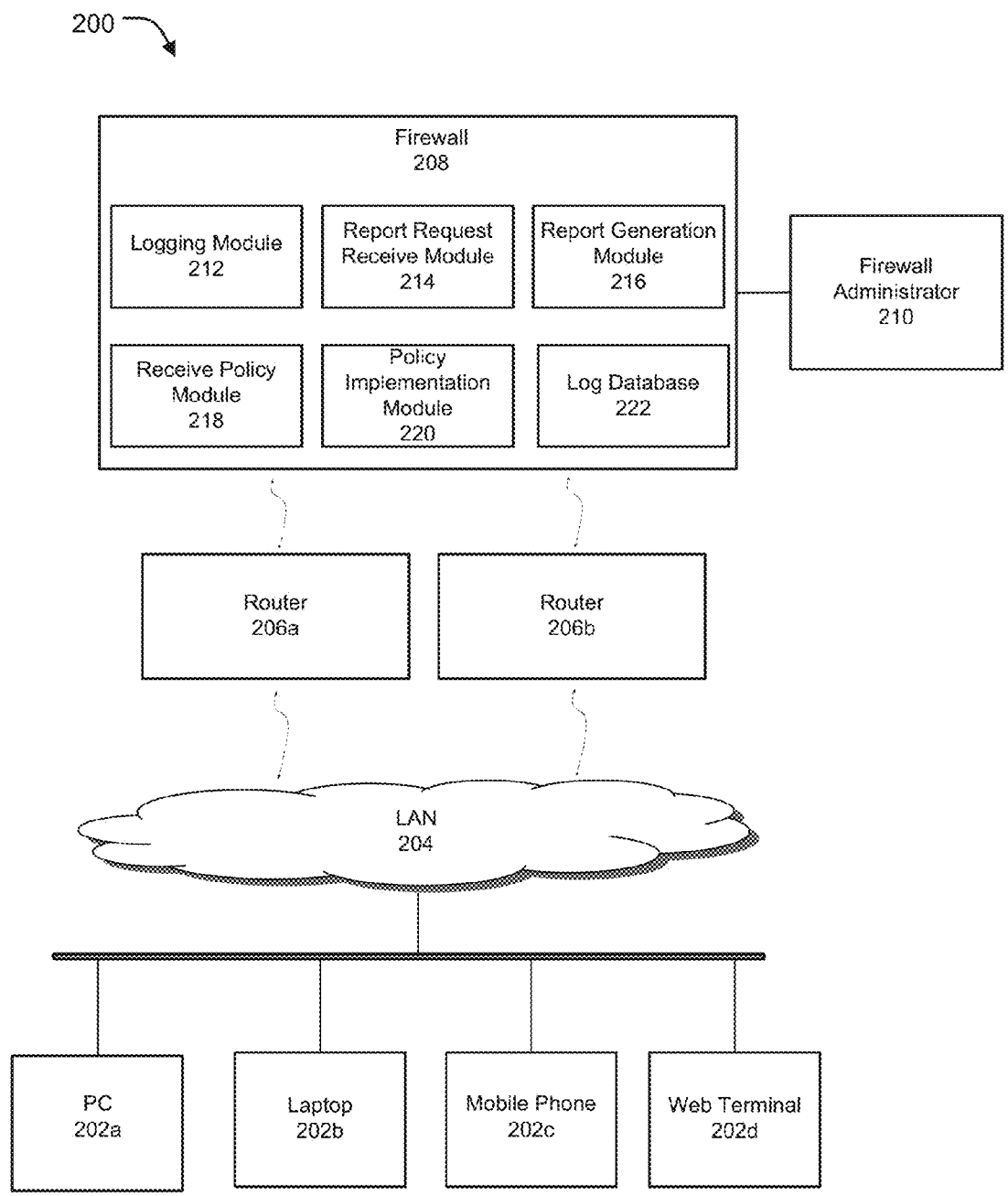
FIG. 2 illustrates a network architecture implementing the proposed firewall policy management system in accordance with an embodiment of the present invention.

FIG. 2 illustrates a network architecture 200 implementing firewall policy management system in accordance with an embodiment of the present invention. It should be appreciated that network configuration presented in FIG. 2 is merely for illustration purpose and any other configuration by use of other or same network devices such as routers, switches, hubs, gateways, access controls, among other such devices can be incorporated. According to one embodiment, computing devices 202a, 202b, 202c, and 202d, which relate to PC, Laptop, Mobile Phone, and Web Terminal respectively, can be connected via wired or wireless connections to a local area network (LAN) 204. Computing devices can be collectively referred to as 202 and can include any other device capable of sending and/or receiving data packets from a network.

According to one embodiment, LAN 204 is connected to routing devices such as routers 206a and 206b, collectively referred to as router 206 hereinafter, which help route or manage traffic flowing from LAN 204 to external network. Network architecture 200 further includes a firewall 208 between computing devices 202 and external network, where firewall 208 acts as a network security or access control mechanism and is configured to shield data and resources from computer network intruders and create an electronic boundary that prevents undesired flow of traffic or data packets between internal and external networks.

According to one embodiment, firewall 208 comprises one or more policies that help regulate flow of traffic and control access of data/content/packets across internal network that it covers. Each policy includes a set of rules that define conditions based on which packets are transferred between networks, wherein such rules can either be automatically developed by a firewall software or can be set by a network/firewall administrator 210 based on organizational needs, strategic business objectives, industry standards, desired communication policies, among other such factors. Firewall policies can be implemented based on multiple parameters such as bandwidth usage, source interface, destination interface, source Internet Protocol (IP) address, destination IP address, event ID, importance, application details, port information, traffic details, timestamps, user details, source device details, destination device details, level of trust, source operating system details, virus scan level, and schedule, among other such parameters.

According to one embodiment, firewall policy creation and implementation system of the present invention comprises configuration of a logging module 212, a report request receive module 214, a report generation module 216, a receive policy module 218, and a policy implementation module 220 on firewall 208. Each of these modules, although illustrated to be implemented within firewall 208, can be implemented and executed on any other device/ system that is operatively coupled with firewall 208 and can help achieve the purpose of efficiently creating and implementing firewall policies.

According to one embodiment, logging module 212 is configured to maintain a log of network traffic observed by firewall 208 by storing, for each network traffic flow, information such as bandwidth usage, source interface, destination interface, source Internet Protocol (IP) address, destination IP address, event ID, importance, application details, port information, traffic details, timestamps, user details, source device details, destination device details, level of trust, source operating system details, virus scan level, and schedule. For instance, for each data packet that is received from a computing device 202, logging module 212 can store details of source interface, sender details, destination information stored in the packet, bandwidth required for allowing packet to pass through, timestamp of transmission, among other attributes which can help determine all characteristics of the packet under consideration.

Logging module 212 can be configured to be operatively coupled with a log database 222 that can either be stored within firewall 208 or in a device operatively coupled with firewall 208. Log database 222 is configured to store all data logged by module 212 for each network traffic flow, where the data can be stored in any easily accessible and retrievable format. For instance, database 222 can be a relational database that stores multiple network attributes as fields of a network traffic table and for each data packet, populates a row of the table with values of the attributes.

According to one embodiment, report request receive module 214 is configured to receive a request from firewall administrator 210 for a customized and interactive report to be generated based on log stored in log database 222. Request received from administrator 210 identifies input report parameters such as specified time frame, specified user, specified user group, specified application, or specified type of application, among other such input parameters based on which report is to be generated. Such a report, being specific and targeted by means of the input parameters, can be used to retrieve focused information from log and help deduce a pattern of traffic flow to help administrator 210 take appropriate measures to create efficient firewall policies that comply with organization/industry standards.

In an instance, request received from administrator 210 can be a combination of input parameters such as the request can demand for a customized report for all social networking applications (such as Facebook, MySpace and LinkedIn) being used between 5-7 PM by Human Resources Department of the concerned organization. Such a request can automatically or manually be converted into a database query to retrieve relevant information from log database 222.

According to one embodiment, report generation module 216 is configured to, based on input parameters received as part of request from administrator 210, generate customized and/or interactive report by extracting information from log stored in log database 222. Further, based on the input parameters, the report generation module 216 is configured to present one or more network traffic items in an aggregate form corresponding to one or more traffic aggregation parameters. Traffic aggregation parameters such as a user, a group of users, a time frame, an application, a type of application, among other such aggregation parameters can be used to enable module 216 to aggregate network traffic items that form part of the desired customized and/or interactive report. Network traffic items can include one or more traffic parameters such as bandwidth usage, source interface, destination interface, source Internet Protocol (IP) address, destination IP address, event ID, importance, application details, port information, traffic details, timestamps, user details, source device details, destination device details, level of trust, source operating system details, virus scan level, schedule, among other such traffic parameters that are stored in log for each network traffic flow.

In an instance, considering that the request from administrator 210 relates to identifying network traffic flow for "Mike Shaw" between 10 AM and 6 PM, one way to generate a report would be to cumulate all requests and traffic parameters thereof made by Mike Shaw along with all data packets and traffic parameters thereof received by Mike Shaw during the desired time period. However, with numerous requests being issued or received each moment, it might become very cumbersome to analyse such a report and derive a specific policy based on such analysis. Therefore, in another embodiment, all transactions of Mike Shaw can be aggregated based on traffic aggregation parameters such as applications, application types, and time frame to arrive at a more accurate and easily determinable conclusion. For instance, categorization of network traffic flow into types of applications such as e-commerce applications, video applications, audio applications, online software applications, social networking applications, mail exchange applications, among other such applications can provide efficiency and accuracy in analysis. In the above instance therefore, a report can be generated mentioning use of Facebook by Mike Shaw for 2.5 hours with bandwidth usage of 55 MB and use of video applications such as Youtube.com for 35 minutes with bandwidth usage of 45 MB. Further details such as time of access, kind of videos being watched, among others can also be presented as desired by administrator 210.

According to one embodiment, report generated by report generation module 216 is customizable and therefore further details, if desired, can be accessed by administrator 210 from the results provided in the report. For instance, aggregated data presented in the report can be broken down into individual network traffic flows or packet level details. Similarly, in order to have a more abstract view of the network traffic pattern for the input parameters, existing network traffic items can further be aggregated to implement high level firewall policies. For instance, instead of application level aggregation that combines usage of each application such as tripadvisor.com, expedia.com, hotels.com, an application type aggregation can be used to cumulate network traffic items based on travel as the application type. Report can further configured to be interactive so as to allow administrator to interact with varied aggregated details and see a customized view of network traffic items relating to input report parameters.

According to one embodiment, report generated by report generation module 216 includes information identifying broad level indicators of network usage such as total running time, total bandwidth usage, total number of users exceeding allocated bandwidth, time slot having maximum bandwidth usage, among other such indicators, where such information is presented based on input report parameters. Presentation of such broad level indicators can assist in giving a starting point to initiate the analysis of report. For instance, once total bandwidth usage is known, user or group of users responsible for high usage of bandwidth can be identified, based on which application types or applications used by such user or group of users can be retrieved and a policy can be defined based on such identified users, applications, time slots, and bandwidth usage patterns.

According to another embodiment, each network traffic item can be associated with an action object such that administrator 210 can use action object to define policy on one or more network traffic items. For instance, network traffic items can include users, time periods, applications, and application types, each of which can be associated with an action object. In such a case, an administrator can put constraints such as block certain applications for certain users at specific time periods by means of action objects associated with the traffic items.

According to one embodiment, receive policy module 218 is configured to receive a directive to implement an appropriate firewall policy for network traffic items, action objects of which have been changed or interacted upon by administrator 210. As discussed above, based on the report generated by report generation module 216, aggregated or non-aggregated network traffic items can be analysed by administrator 210 to check for compliance of one or more network traffic items with organizational needs, industry standards, strategic business objectives, ethical requirements, among other attributes and use action objects to put constraints on desired traffic items and accordingly issue a directive that is received by receive policy module 218 of firewall 208. Directive can either be implemented on a user, a group of users, a department, or on the complete organization and can include multiple combinations of constraints such as a request to completely block flow of packet having specific characteristics or set up a schedule for or setup a time limitation or bandwidth limitation for one or more network traffic items. For instance, on one hand, access to Facebook can completely be blocked for R&D Department, whereas on the other hand, access to LinkedIn can be limited and scheduled for access only between 5:30 PM to 6 PM. Bandwidth level limitations can include download of files up to a limit of 10 MB, wherein such limitations can change based on user in context, time of day, day of week, among many other such factors. Administrator 210 can also be allowed to issue multiple directives as and when desired or instructed based on organization level policy change such that multiple rules can be issued for implementation by firewall 208.

According to one embodiment, directive can further include time frame during which network traffic item of which action object has been selected is permitted or prohibited or can include total amount of time during which one or more network traffic items are permitted per day. Directive can further be configured to include maximum amount of total bandwidth permitted per day for one or more network traffic items or can include maximum instantaneous bandwidth rate permitted at any given time for one or more network traffic items. Many other such combinations can be implemented to comply with desired firewall and network management requirements.

Policy implementation module 220 can be configured to define and establish appropriate firewall policy based on directive issued by administrator 210. According to one embodiment, one or more directives can be configured to be issued based on interactions between administrator and one or more action objects of traffic items, and for each such directive, relevant interactions can identified and policies can be defined on the selected network traffic items. Based on actions taken on selected network traffic items, firewall policy can be configured to include blocking specified applications or specified types of applications. Firewall policy can also include blocking specified applications or specified types of applications for specified users or user groups.

According to one embodiment, firewall policy can also include imposing time or bandwidth limitations on specified application or specified types of applications or imposing time or bandwidth limitations on specified applications or specified types of applications by specified user or user groups. According to yet another embodiment, firewall policy can further include imposing time or bandwidth limitations on specified users or user groups or include limiting use of specified application or specified type of application to a particular time frame. Firewall policies can also be configured to limit use of specified applications or types of applications to a particular time frame by specified user or user groups. It should be appreciated that any other combination of restrictions or permissions can be implemented on users, time periods, bandwidths, or applications, among other network traffic items as part of firewall policies based on interactions between administrator and action objects associated with network traffic items.

Figure 3:
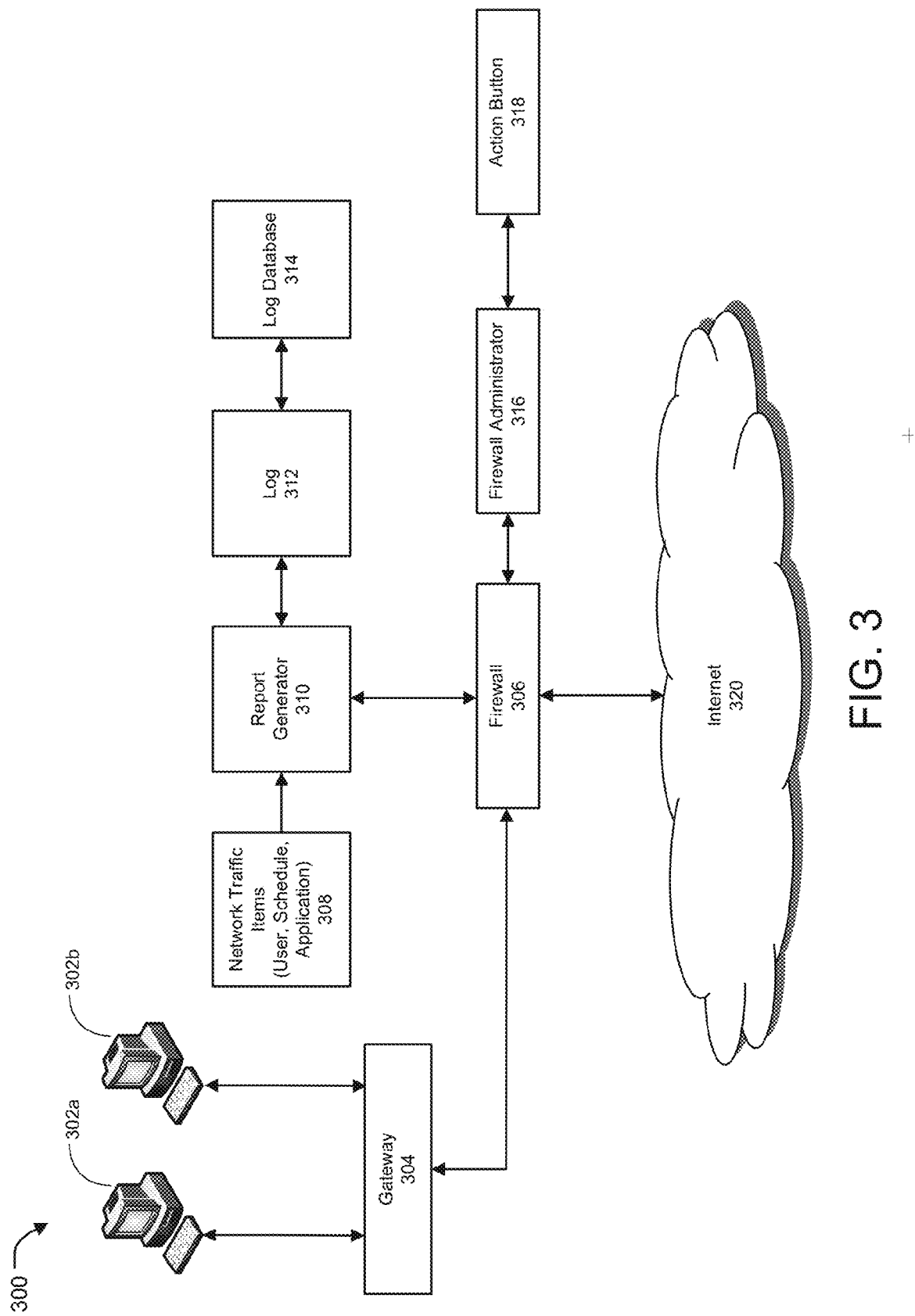
FIG. 3 illustrates a block diagram of the proposed firewall policy management system in accordance with an embodiment of the present invention.

FIG. 3 illustrates an exemplary block diagram 300 of the proposed firewall policy management system in accordance with an embodiment of the present invention. According to one embodiment, system 300 comprises computing devices 302a and 302b, collectively referred to as computing devices 302 hereinafter, which are operatively coupled to a gateway 304 that allows access or transfer of data packets from internal to external network 320 and visa-versa. Gateway 304 is coupled with a firewall 306 to control flow of network traffic by implementing suitable rules and policies.

According to one embodiment, firewall 306 is operatively accessible to a firewall administrator 316 that helps define, implement, and manage firewall policies for internal network having computing devices 302. Firewall 306 includes an event log 312 that can either be stored on the firewall 306 in a log database 314 or on any other storage device operatively coupled to firewall 306. Log 312 is configured to store information such as bandwidth usage, source interface, destination interface, source Internet Protocol (IP) address, destination IP address, event ID, importance, application details, port information, traffic details, timestamps, bandwidth consumption, user details, source device details, destination device details, level of trust, source operating system details, virus scan level, schedule, for each network traffic flow or data packet.

According to one embodiment, in implementation, firewall administrator 316 requests for a customized and interactive report to be generated based on log 312 and further based on input report parameters. Input parameters are used for refining log 312 to generate a report that presents specific information on desired network traffic items such as users, schedule, applications, types of applications, among other such items. Network traffic items 308 include traffic attributes on which or by use of which constraints or restrictions can be imposed or removed. Such network traffic items 308 include but are not limited to users, groups of users, schedules, applications, types of applications, bandwidths, flow direction, among other such attributes. Firewall sends the report generation request to report generator 310, which, based on input report parameters from administrator 316 and by means of log 312 and network traffic items 308 generates customized and interactive report by extracting relevant information from log 312 based on the report parameters and presents one or more desired network traffic items.

According to one embodiment, report is then analysed by administrator 316 to identify network traffic flow pattern and based on the analysis with respect to organizational requirements and business objectives, a directive is received by firewall 306 to implement an appropriate firewall policy for one or more network traffic items 308. Firewall 306, based on the directive, defines and establishes appropriate firewall policy that is used to control traffic flow between internal and external networks.

FIGS. 4A and 4B illustrate a snapshot of an exemplary log 400 and a report 410 generated by proposed firewall policy management system in accordance with an embodiment of the present invention. As illustrated, log 400 can be maintained by a firewall and include information characterizing network traffic flow such as bandwidth usage, source interface, destination interface, source Internet Protocol (IP) address, destination IP address, event ID, importance, application details, port information, traffic details, timestamps, user details, source device details, destination device details, level of trust, source operating system details, virus scan level, schedule, among other such attributes.

Log 400, as illustrated in FIG. 4A, is an exemplary snapshot presenting a subset of network traffic flow information and includes attributes user, source IP, destination IP, application, importance, port, duration, and usage. As also illustrated, log 400 can be maintained for all traffic flows received by firewall from internal or external networks and can include information of all users and their respective interactions, with highest usage, in FIG. 4A, being of 35 MB by Hans Yin between 12 PM-14:30 PM by use of Minecraft application.

According to one embodiment, in reference to FIG. 4B, using log 400 maintained by firewall, a report 410 can be generated based on a request received from firewall administrator, wherein the request includes report parameters such as specified time frame, specified user, specified user group, specified application, specified type of application, among other such report parameters. Exemplary report 410 of FIG. 4B has been generated with user "Kooby Yin" as a input report parameter so as to enable the administrator to analyze all network interactions of the user and issue an appropriate directive based on the analysis. For instance, as shown in FIG. 4B, Kooby Yin used Minecraft application for around 4 hours on 11/8 and over 2 hours on 11/9. Based on an analysis of the network traffic flow for input report parameters, administrator can accordingly issue a directive to block or limit/schedule the usage of Minecraft application for Kooby Yin.

It should be appreciated that FIGS. 4A and 4B show an exemplary and very simplistic representation of log 400 and report 410, which in reality would include numerous entries of network traffic flows spanning over days. The proposed system can, for such a log 400, by means of accurate input report parameters generate a report 410 through a desired selection of network traffic items and traffic aggregation parameters, allowing administrator an easy way to analyze network traffic items to be acted upon and issue a directive by interacting with action objects of selected network traffic items.

Figure 5:
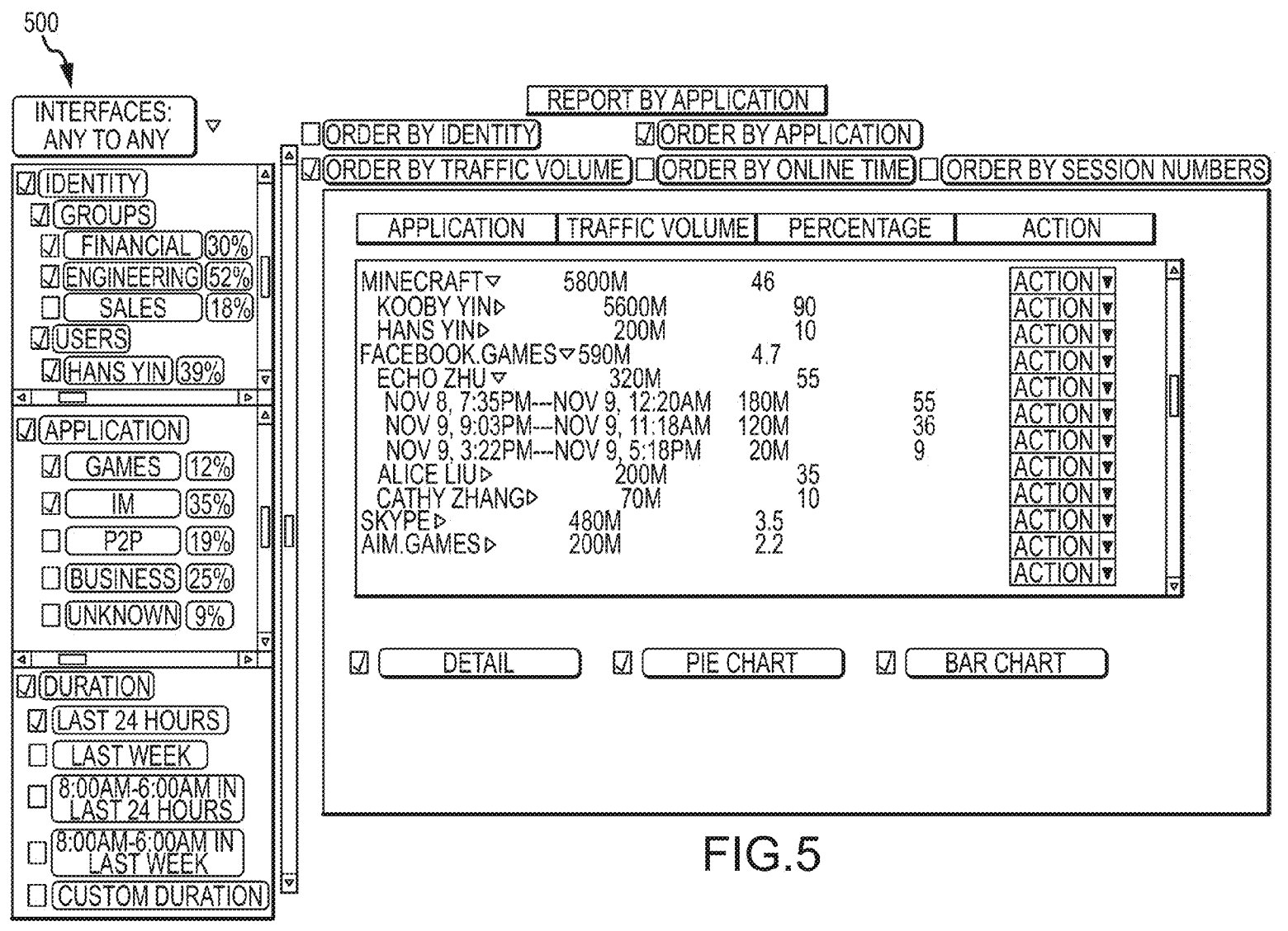

FIG. 5 illustrates a screenshot 500 of the proposed firewall policy management system in accordance with an embodiment of the present invention. Screen 500 illustrates a report generated by report generation module of firewall and further illustrates options of sorting or ordering network traffic items such as applications, traffic volume, user details, bandwidth consumed, identification attributes, percentage of memory consumed for each application, among other such items. Report can further include action objects for each network traffic item that allow firewall administrator to take one or more actions on the selected network traffic items. As illustrated, screen 500 is presented with respect to applications and displays use of multiple applications by one or more users and also presents attributes of usage such as time for which the application was used, traffic volume, bandwidth consumed, among other such attributes.

Left pane of screen 500 illustrates different aggregation parameters that can help select the level of abstraction or customize the view of report for administrator to analyse different factors such as bandwidth usage, activities across time intervals, user network interaction pattern, among other factors, and use such analysis to issue a directive to firewall for definition of policy. As illustrated, screen 500 enables customized selection of network traffic items, where FIG. 5 shows selection of "application" and "traffic volume" as traffic items and therefore the view presented in screen 500 shows applications (such as Minecraft, Facebook games, Skype, and Aim games) and users (Kooby Yin, Hans Yin, Echo Zhu, Alice Liu, Cathy Zhang) using the applications at varied times. Screen 500 also shows traffic volume used by each user during the time they used the application, which as a whole can enable administrator to take necessary action on one or more network terrific items.

Figure 6:
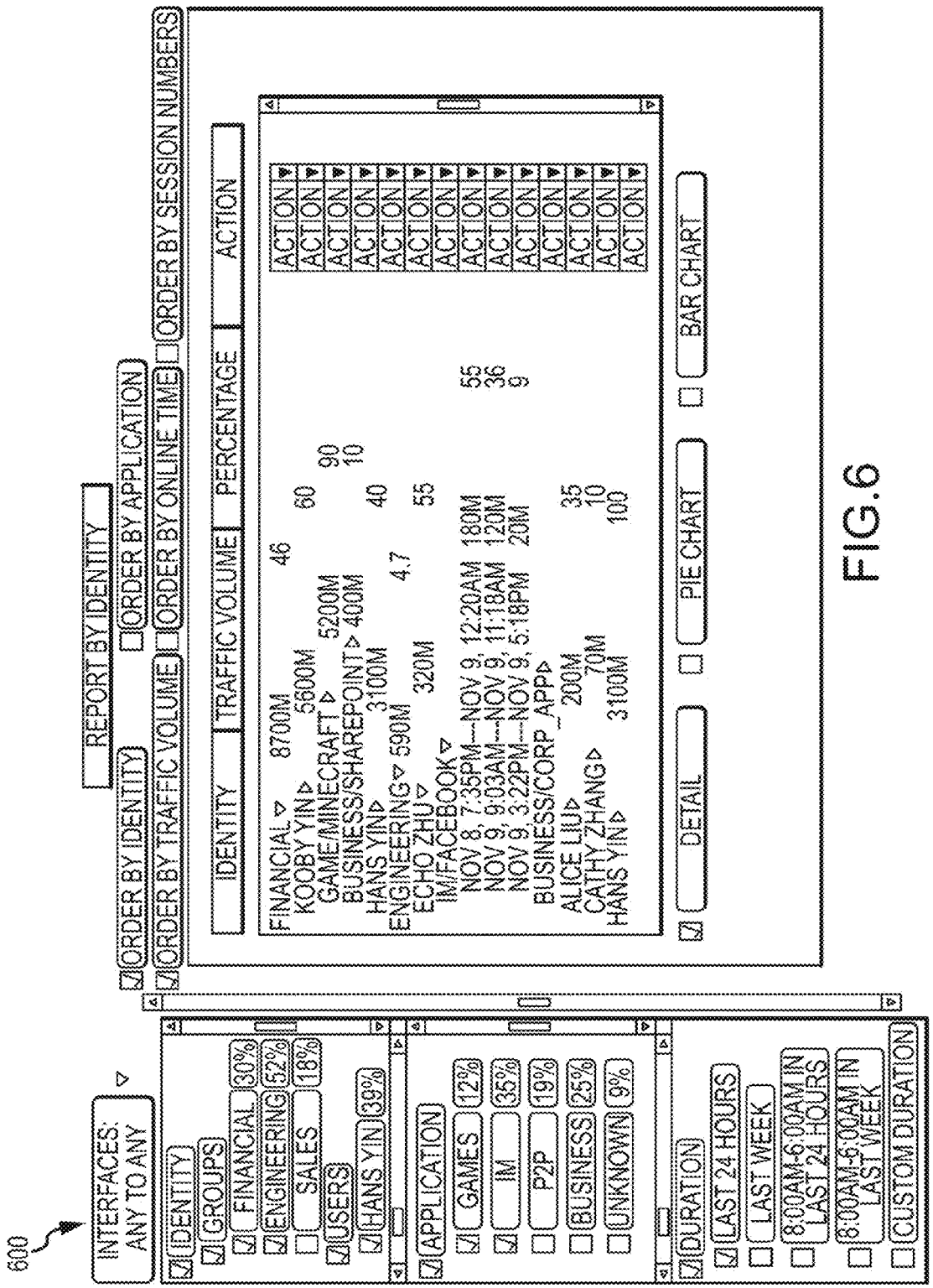
FIG. 6 illustrates a screenshot of the proposed firewall policy management system in accordance with an embodiment of the present invention.

FIG. 6 illustrates a screenshot 600 of the proposed firewall policy management system in accordance with an embodiment of the present invention. Screen 600 presents a report generated based on "identity" as the input report parameter where identity refers to users, groups of users, departments, branch offices, among others entities that use network traffic flows for sending/receiving data packets. As illustrated, display area of screen 600 includes multiple departmental groups such as Financial, Engineering, that have been selected from a list groups such as financial, engineering, and sales as shown on left pane of screen 600. As also illustrated, along with groups, individual users can also be selected based on input parameters that are received by report request receive module. In the present illustration, "Hans Yin" has been selected as the user and therefore display pane of screen 600 shows "Hans Yin" and details of traffic volume, percentage of bandwidth consumed, among other traffic items to enable administrator to use corresponding action objects to issue a directive for policy definition.

According to one embodiment, as discussed above, representation of each network traffic item can be aggregated based on traffic aggregation parameters such as user, group of users, time frame, application, bandwidth, type of application, among other such parameters, which can help customize report layout and analyse only relevant and desired information. Drop downs or any other such known mechanisms can be used to filter the level of details desired for viewing. As illustrated, screen 600 can also be configured to present information on input parameters based on desired duration interval, which can be configured as shown on lower left pane of the report 600. During analysis, apart from organizational requirement and other company wide requirements, bandwidth usage based decisions can also be made to impose restrictions on users or groups of users. For instance, in screen 600, user Kooby Yin uses the application Minecraft that consumes significantly more bandwidth/traffic volume when compared with any other application, and therefore usage of Minecraft can either be blocked for Kooby Yin or can be restricted/allowed for a specified time interval.

FIG. 7 illustrates a screenshot 700 of the proposed firewall policy management system in accordance with an embodiment of the present invention. Screen 700 presents interaction between administrator and action objects of one or more network traffic items. As shown, based on analysis of report generated by firewall, administrator can select one or more network traffic items such as identity, schedule, bandwidth, applications, among other such traffic items on which action needs to be taken for implementation of firewall policy. Such actions can include blocking access of certain applications or types of applications for specified users or groups of users or departments. Actions can further include controlling or restricting the direction of flow of traffic, which include Any to Any, Internal to External Network, External to Internal Network, or can be customized based on ranges of IP addresses, among many other combinations. As illustrated in screen 700, network traffic items include identity of "Kooby Yin" and Application as "Minecraft", based on which further network traffic items such as schedule, flow direction, among others have been controlled. As also illustrated, administrator interacts with action objects to block access of Minecraft for Kooby Yin and restricts flow of data packets relating to this application in any direction (from Kooby Yin to the server of Minecraft or visa versa).

FIG. 8 illustrates a screenshot 800 of the proposed firewall policy management system in accordance with an embodiment of the present invention. Screen 800 illustrates action objects corresponding to multiple network traffic elements such as applications, identity, schedule, bandwidth, and flow direction, and further illustrates action being taken by administrator based on application "Minecraft". As illustrated, administrator can select users, groups of users, or departments, or everyone in the organization on which the policy is to be defined, such as "Anyone" has been selected in the present instance. Once application and identity have been selected, access of application to identify can be defined in terms of traffic items such as schedule, bandwidth, flow direction, among other items. In the present example, access of Minecraft has been limited for all users of internal network to a traffic volume of 50 MB and only traffic from internal to external network has been permitted.

Figure 9:
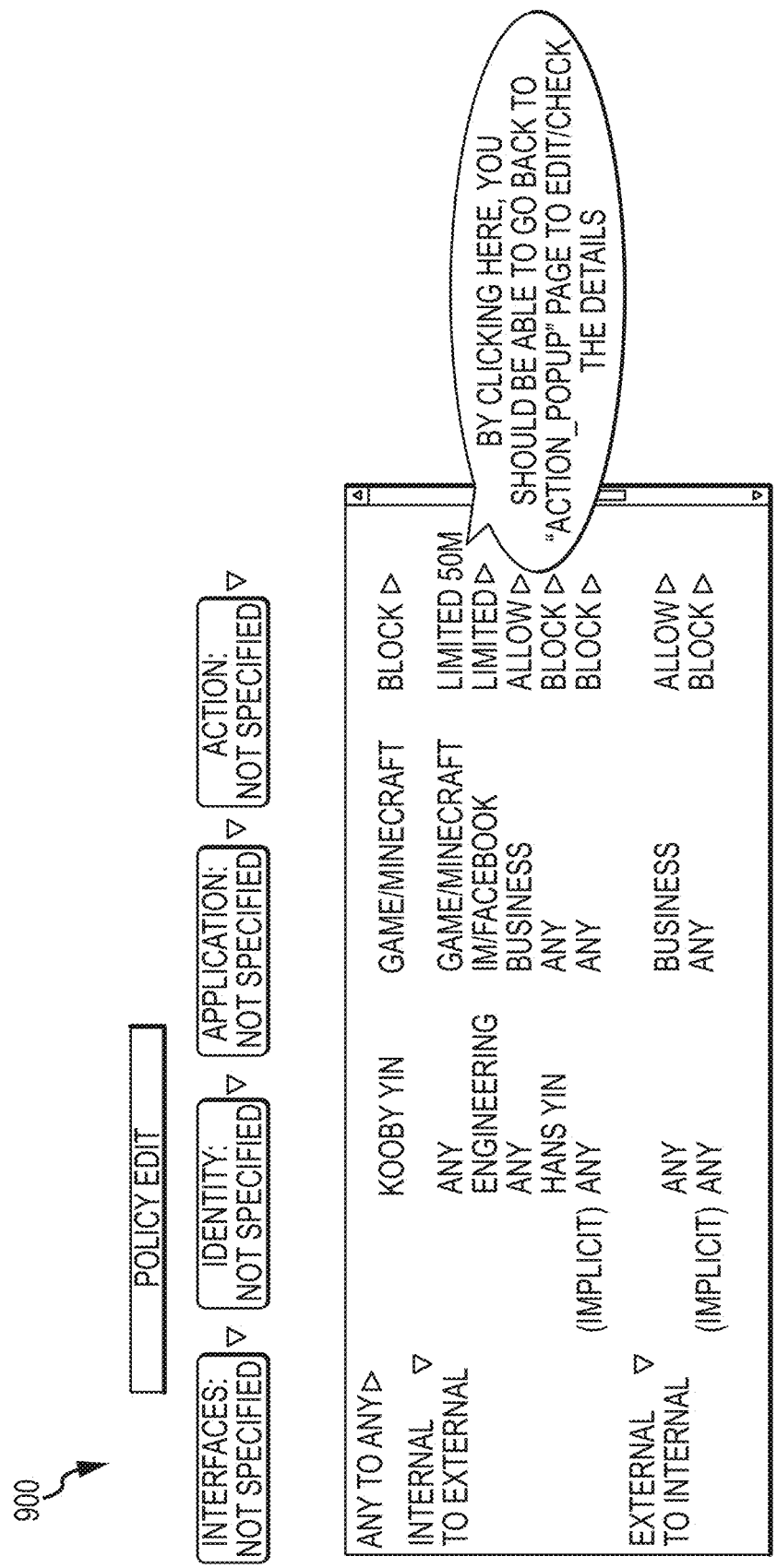
FIG. 9 illustrates a screenshot of the proposed firewall policy management system in accordance with an embodiment of the present invention.

FIG. 9 illustrates a screenshot 900 of the proposed firewall policy management system in accordance with an embodiment of the present invention. Screen 900 illustrates an edit screen of firewall policies once such policies have been defined and established in firewall. As illustrated, screen 900 shows multiple existing and already implemented policies in a given firewall, each of which is associated with an edit button, the use of which can enable change of settings in terms of one or more network traffic items. For instance, as seen in display of screen 900, one policy relates to blocking all access of Minecraft to Kooby Yin, which through the present screen 900, if desired can be edited to enable limited access of the application to Kooby Yin, say from 6 PM to 7 PM on Monday and Wednesday of each week.

Figure 10:
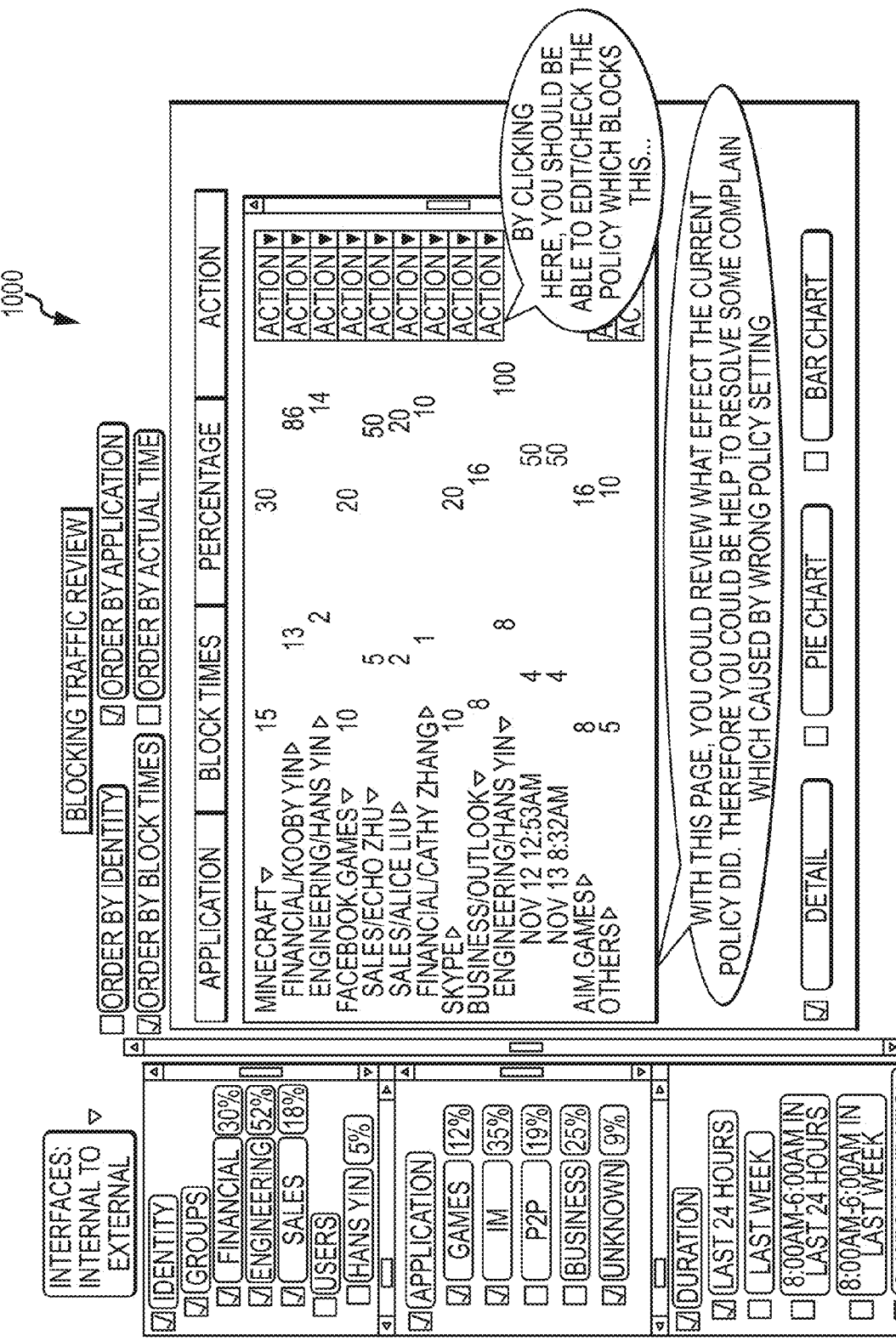
FIG. 10 illustrates a screenshot of the proposed firewall policy management system in accordance with an embodiment of the present invention.

FIG. 10 illustrates a screenshot 1000 of the proposed firewall policy management system in accordance with an embodiment of the present invention. Screen 1000 shows a display that is presented after edit button has been clicked on one or more firewall policies. As illustrated, screen 1000 looks similar to screens in FIG. 5-6 which allow setting of firewall policies based on action objects. According to one embodiment, same or multiple different screens 1000 can be configured to change one or more firewall policies as each policy focuses on different network traffic items. Once an administrator is on screen 1000, one or more network traffic items including identity, application, duration/schedule, among others can be acted upon through use of their corresponding action objects and existing policy can accordingly be modified or edited.

Figure 11:
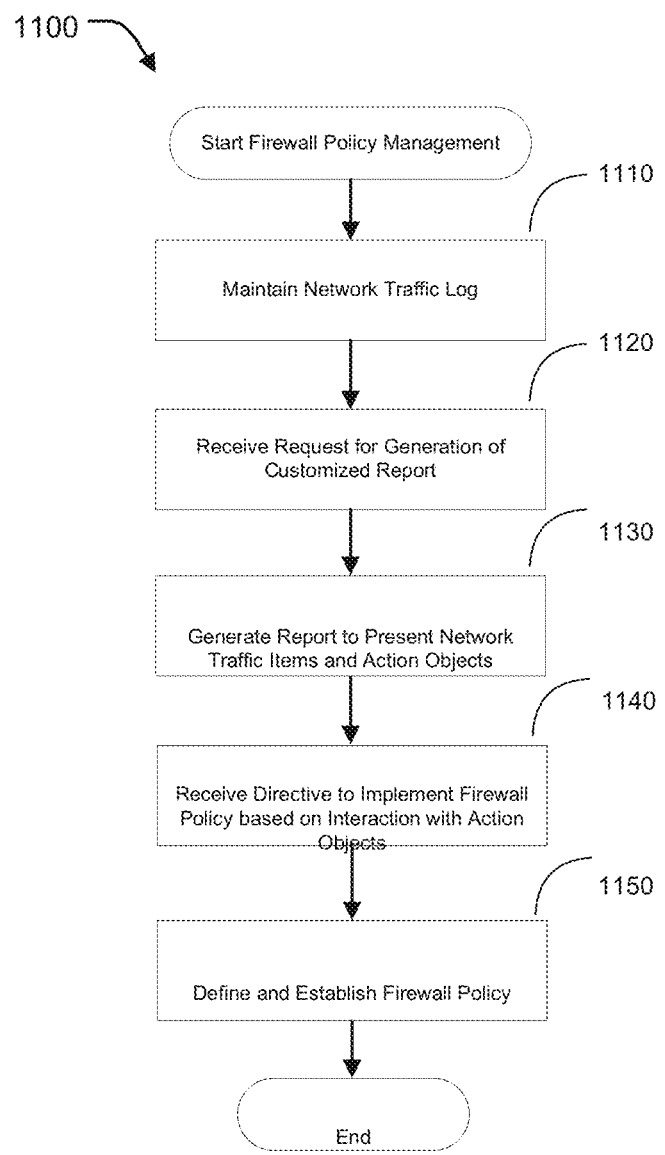
FIG. 11 is a flow diagram illustrating firewall policy creation and management in accordance with an embodiment of the present invention.

FIG. 11 is a flow diagram illustrating a method 1100 for firewall policy creation and implementation. Method 1100 of the present system allows efficient evaluation of traffic flow pattern by an administrator without having to understand the routing details or other technical/hardware aspects of network architecture.

At block 1110, firewall maintains a log of network traffic for each data packet that is received by firewall from either external network or internal network, where the log includes information such as bandwidth usage, source interface, destination interface, source Internet Protocol (IP) address, destination IP address, event ID, importance, application details, port information, traffic details, timestamps, user details, source device details, destination device details, level of trust, source operating system details, virus scan level, schedule, among other such information.

At block 1120, firewall receives an administrator request for a customized and interactive report to be generated based on the log of firewall. Such a report is configured to include specific network traffic items that are retrieved based on one or more input report parameters that form part of the administrator request. Report parameters such as specified time frame, specified user, specified user group, specified application, specific bandwidth usage, specified type of application, among other such parameters can be used to filter the log and generate the desired report based on which firewall policy is implemented.

At block 1130, firewall generates the customized and interactive report by extracting information from log based on report parameters, where the report presents one or more network traffic items that are associated with action objects, using which administrator can interact and impose restrictions on desired traffic items. According to one embodiment, network traffic items that form part in the report are presented in aggregate form corresponding to one or more traffic aggregation parameters such as user, group of users, time frame, bandwidth, traffic volume, application, type of application, among other such aggregation parameters. According to another embodiment, report can further include broad level information such as total running time and total bandwidth usage for each network traffic item. Customized and interactive report can either be stored on firewall or on administrator's computing device or can be stored on any other storage device that is operatively coupled with firewall and accessible to administrator.

At block 1140, in response to action taken by administrator on action objects of one or more network traffic items, firewall receives a directive to implement an appropriate firewall policy for corresponding network traffic items. According to one embodiment, network traffic items can include attributes of network traffic flow that are stored in the log and as each item is associated with one or more action objects, administrator can, based on analysis of report, make necessary interaction with desired action objects to put controls and restraints on one or more traffic items and accordingly issue a directive to firewall.

At block 1150, firewall, based on directive and information from the log, is configured to define and establish appropriate firewall policy on the firewall. Once defined and implemented, each policy can also be edited as and when desired by controlling action objects of one or more network traffic items.

Figure 12:
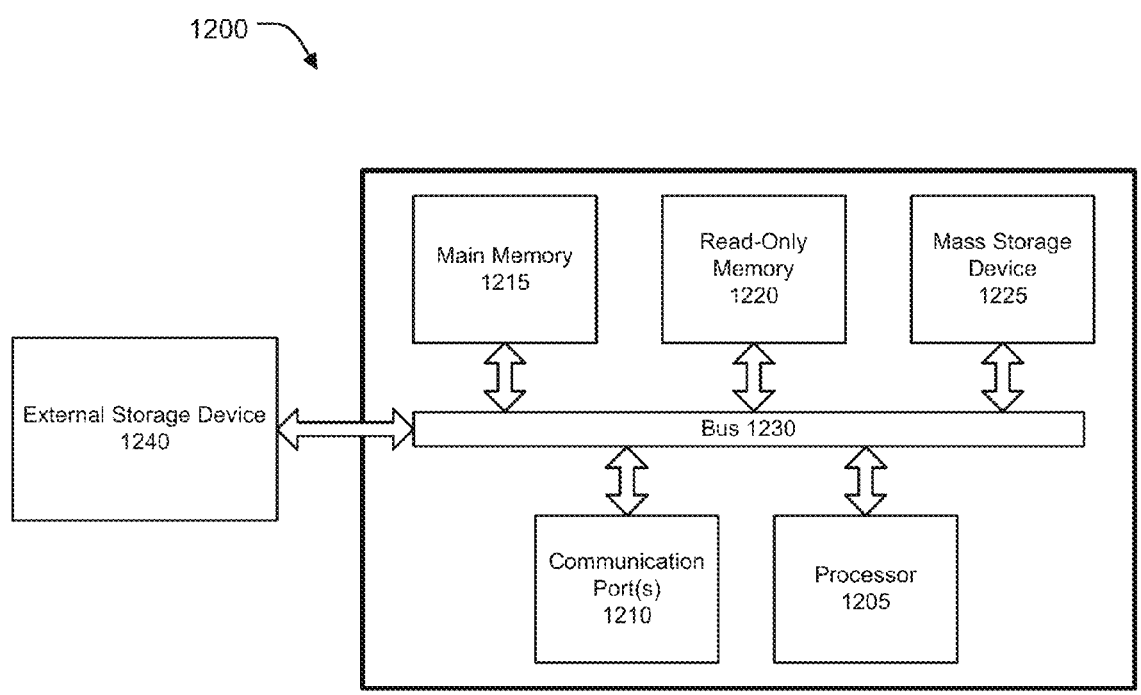
FIG. 12 is an exemplary computer system in which or with which embodiments of the present invention may be utilized.

FIG. 12 is an example of a computer system 1200 with which embodiments of the present disclosure may be utilized. Computer system 1200 may represent or form a part of a network security device, such as a firewall (e.g., firewall 106a, 106b or firewall 208), a server or a firewall administrator's workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1200 includes a bus 1230, a processor 1205, communication port 1210, a main memory 1215, a removable storage media 1240, a read only memory 1220 and a mass storage 1225. A person skilled in the art will appreciate that computer system 1200 may include more than one processor and communication ports.

Examples of processor 1205 include, but are not limited to, an Intel® Itanium® or Itanium 2 processor(s), or AMD® Opteron® or Athlon MP® processor(s), Motorola® lines of processors, FortiSOC™ system on a chip processors or other future processors. In one embodiment, processor 1205 may execute software representing one or more of the various modules associated with firewall 208 as described with reference to FIG. 2.

Communication port 1210 can be any of an RS-232 port for use with a modem based dialup connection, a 10/100 Ethernet port, a Gigabit or 10 Gigabit port using copper or fiber, a serial port, a parallel port, or other existing or future ports. Communication port 1210 may be chosen depending on a network, such a Local Area Network (LAN), Wide Area Network (WAN), or any network to which computer system 1200 connects.

Memory 1215 can be Random Access Memory (RAM), or any other dynamic storage device commonly known in the art. Read only memory 1220 can be any static storage device(s) such as, but not limited to, a Programmable Read Only Memory (PROM) chips for storing static information such as start-up or BIOS instructions for processor 1205.

Mass storage 1225 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1230 communicatively couples processor(s) 1205 with the other memory, storage and communication blocks. Bus 1230 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1205 to system memory.

Optionally, operator and administrative interfaces, such as a display, keyboard, and a cursor control device, may also be coupled to bus 1230 to support direct operator interaction with computer system 1200. Other operator and administrative interfaces can be provided through network connections connected through communication port 1210.

Removable storage media 1240 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:

maintaining, by a firewall running on a network security device associated with a private network, a log of network traffic observed by the firewall by storing, for each network traffic flow, information regarding one or more of a volume of traffic, a source interface, a destination interface, a source Internet Protocol (IP) address, a destination IP address, an application name, an application type, port information, a start time, an end time and a username associated with the network traffic flow;

receiving, via a graphical user interface (GUI) associated with the firewall, a request from an administrator of the private network for a report to be generated based on the log, the request containing information indicative of report parameters including (i) a specified time frame, (ii) user information indicative of one or more users associated with the private network; and (iii) application information indicative of one or more particular applications or one or more types of applications associated with the logged network traffic;

extracting from the log, by the firewall, information regarding network traffic flows satisfying the report parameters;

presenting, by the firewall, via the GUI a customized and interactive hierarchical report to the administrator, wherein the customized and interactive hierarchical report includes (i) a plurality of aggregated network traffic items; and (ii) a plurality of action objects each corresponding to one of the plurality of aggregated network traffic items, wherein information associated with the plurality of aggregated network traffic items is determined by individually aggregating each of a plurality of traffic aggregation parameters for each observed value of a primary report parameter within the extracted information, wherein the plurality of traffic aggregation parameters, include one or more of traffic volume and percentage of traffic volume; and responsive to interaction by the administrator with a particular action object of the plurality of action objects and selection by the administrator of an action to be taken on subsequently received network traffic matching the corresponding aggregated network traffic item of the plurality of aggregated network traffic items, automatically defining and establishing, by the firewall, an appropriate firewall policy including one or more rules identifying the matching network traffic and a corresponding action to be taken on the matching network traffic based on the selection.

2. The method of claim 1, further comprising presenting, by the firewall, to the administrator via the GUI a plurality of options regarding actions to be taken on the matching network traffic that is subsequently observed by the firewall, wherein the plurality of options include one or more of (i) blocking the matching network traffic, (ii) selectively allowing or blocking the matching network traffic in accordance with a defined schedule and (iii) enforcing a bandwidth limitation on the matching network traffic.

3. The method of claim 2, wherein the bandwidth limitation includes information regarding a maximum amount of total bandwidth permitted per day for the matching network traffic.

4. The method of claim 2, wherein the bandwidth limitation includes information regarding a maximum instantaneous bandwidth rate permitted at any given time for the matching network traffic.

5. The method of claim 1, further comprising responsive to a drill down request relating to a particular aggregated network traffic item of the aggregated network traffic items, updating, by the firewall, the customized and interactive hierarchical report to include (i) aggregated subtotal network traffic items for each observed value of a secondary report parameter of the report parameters; and (ii) an action object corresponding to each aggregated subtotal network traffic item, wherein the aggregated subtotal network traffic items are determined by individually aggregating each of the plurality of traffic aggregation parameters for each observed value of the secondary report parameter within the extracted information corresponding to the particular aggregated network traffic item.

6. The method of claim 5, wherein the primary report parameter comprises the user information and the secondary report parameter comprises the application information.

7. The method of claim 5, wherein the primary report parameter comprises the application information and the secondary report parameter comprises the user information.

8. The method of claim 1, wherein the user information specifies one or more groups of users or one or more users associated with the private network.

9. The method of claim 1, wherein the one or more types of applications include unknown applications, business applications, games, instant messaging applications and peer-to-peer applications.

10. The method of claim 1, wherein the defined schedule includes information regarding a time frame during which the matching network traffic is permitted or prohibited.

11. The method of claim 1, wherein the defined schedule includes information regarding a total amount of time during which the matching network traffic is permitted per day.

12. A non-transitory computer-readable storage medium embodying a set of instructions representing a firewall, which when executed by one or more microprocessors of a network security device associated with a private network, cause the one or more microprocessors to perform a method comprising:

maintaining a log of network traffic observed by the firewall by storing, for each network traffic flow, information regarding one or more of a volume of traffic, a source interface, a destination interface, a source Internet Protocol (IP) address, a destination IP address, an application name, an application type, port information, a start time, an end time and a username associated with the network traffic flow;

receiving, via a graphical user interface (GUI) associated with the firewall, a request from an administrator of the private network for a report to be generated based on the log, the request containing information indicative of report parameters including (i) a specified time frame, (ii) user information indicative of one or more users associated with the private network; and (iii) application information indicative of one or more particular applications or one or more types of applications associated with the logged network traffic;

extracting from the log information regarding network traffic flows satisfying the report parameters;

presenting via the GUI a customized and interactive hierarchical report to the administrator, wherein the customized and interactive hierarchical report includes (i) a plurality of aggregated network traffic items; and (ii) a plurality of action objects each corresponding to one of the plurality of aggregated network traffic items, wherein information associated with the plurality of aggregated network traffic items is determined by individually aggregating each of a plurality of traffic aggregation parameters for each observed value of a primary report parameter within the extracted information, wherein the plurality of traffic aggregation parameters, include one or more of traffic volume and percentage of traffic volume; and responsive to interaction by the administrator with a particular action object of the plurality of action objects and selection by the administrator of an action to be taken on subsequently received network traffic matching the corresponding aggregated network traffic item of the plurality of aggregated network traffic items, automatically defining and establishing an appropriate firewall policy including one or more rules identifying the matching network traffic and a corresponding action to be taken on the matching network traffic based on the selection.

13. The non-transitory computer-readable storage medium of claim 12, wherein the method further comprises presenting to the administrator via the GUI a plurality of options regarding actions to be taken on the matching network traffic that is subsequently observed by the firewall, wherein the plurality of options include one or more of (i) blocking the matching network traffic, (ii) selectively allowing or blocking the matching network traffic in accordance with a defined schedule and (iii) enforcing a bandwidth limitation on the matching network traffic.

14. The non-transitory computer-readable storage medium of claim 13, wherein the bandwidth limitation includes information regarding a maximum amount of total bandwidth permitted per day for the matching network traffic.

15. The non-transitory computer-readable storage medium of claim 13, wherein the bandwidth limitation includes information regarding a maximum instantaneous bandwidth rate permitted at any given time for the matching network traffic.

16. The non-transitory computer-readable storage medium of claim 12, wherein the method further comprises responsive to a drill down request relating to a particular aggregated network traffic item of the aggregated network traffic items, updating the customized and interactive hierarchical report to include (i) aggregated subtotal network traffic items for each observed value of a secondary report parameter of the report parameters; and (ii) an action object corresponding to each aggregated subtotal network traffic item, wherein the aggregated subtotal network traffic items are determined by individually aggregating each of the plurality of traffic aggregation parameters for each observed value of the secondary report parameter within the extracted information corresponding to the particular aggregated network traffic item.

17. The non-transitory computer-readable storage medium of claim 16, wherein the primary report parameter comprises the user information and the secondary report parameter comprises the application information.

18. The non-transitory computer-readable storage medium of claim 16, wherein the primary report parameter comprises the application information and the secondary report parameter comprises the user information.

19. The non-transitory computer-readable storage medium of claim 12, wherein the user information specifies one or more groups of users or one or more users associated with the private network.

20. The non-transitory computer-readable storage medium of claim 12, wherein the one or more types of applications include unknown applications, business applications, games, instant messaging applications and peer-to-peer applications.

21. The non-transitory computer-readable storage medium of claim 12, wherein the defined schedule includes information regarding a time frame during which the matching network traffic is permitted or prohibited.

22. The non-transitory computer-readable storage medium of claim 12, wherein the defined schedule includes information regarding a total amount of time during which the matching network traffic is permitted per day.

* * * * *